United States Patent
Cederwall et al.

(10) Patent No.: US 12,292,260 B2
(45) Date of Patent: May 6, 2025

(54) REFLECTOR DEVICE AND SYSTEM FOR SELECTIVE REFLECTION OF ELECTROMAGNETIC RADIATION

(71) Applicant: SAAB AB, Linkoeping (SE)

(72) Inventors: Per Cederwall, Kullavik (SE); Stefan Andersson, Mullsjoe (SE)

(73) Assignee: SAAB AB, Linkoeping (SE)

(*) Notice: Subject to any disclaimer, the term of this patent is extended or adjusted under 35 U.S.C. 154(b) by 997 days.

(21) Appl. No.: 17/309,547

(22) PCT Filed: Dec. 13, 2018

(86) PCT No.: PCT/SE2018/051307
§ 371 (c)(1),
(2) Date: Jun. 4, 2021

(87) PCT Pub. No.: WO2020/122777
PCT Pub. Date: Jun. 18, 2020

(65) Prior Publication Data
US 2022/0026177 A1    Jan. 27, 2022

(51) Int. Cl.
*G02B 5/12* (2006.01)
*F41G 3/26* (2006.01)
(Continued)

(52) U.S. Cl.
CPC ......... *F41G 3/2655* (2013.01); *F41G 3/2688* (2013.01); *F41J 2/00* (2013.01);
(Continued)

(58) Field of Classification Search
CPC ......... F41G 3/2655; F41G 3/2688; F41J 2/00; G01S 13/75; G01S 17/02; G01S 13/753;
(Continued)

(56) References Cited

U.S. PATENT DOCUMENTS

| 6,139,323 A | 10/2000 | Christians et al. |
| 2003/0107519 A1 | 6/2003 | Snow et al. |

(Continued)

FOREIGN PATENT DOCUMENTS

| WO | WO 2005/001511 A1 | 1/2005 |
| WO | WO 2009/146446 A1 | 12/2009 |

(Continued)

OTHER PUBLICATIONS

International Searching Authority (ISA), International Search Report and Written Opinion received for Application No. PCT/SE2018/051307, dated Sep. 11, 2019, 15 pages, Swedish Patent and Registration Office, Sweden.

(Continued)

*Primary Examiner* — Euncha P Cherry
(74) *Attorney, Agent, or Firm* — Alston & Bird LLP (57) ABSTRACT

The invention relates to a reflector comprising a reflector cavity (110) having a front opening for receiving EMR into the reflector cavity (110) for subsequent reflection of the EMR by at least one reflector element (120) arranged within the reflector cavity (110), characterized in that the reflector further comprises a front cover (130) that has high EM R transmittance in at least parts of the EM spectrum, the front cover (130) being arranged to cover the front opening of the reflector cavity (110), and that the front cover (130) and front opening form a gastight seal (140) impermeable to gas to prevent transport of material into and out of the reflector cavity (110) through the front opening.

42 Claims, 7 Drawing Sheets

(51) Int. Cl.
  *F41J 2/00* (2006.01)
  *G01S 13/75* (2006.01)
  *G01S 17/02* (2020.01)

(52) U.S. Cl.
  CPC .............. *G01S 13/75* (2013.01); *G01S 17/02* (2013.01); *G02B 5/12* (2013.01)

(58) Field of Classification Search
  CPC ............ G01S 17/88; G01S 2013/9323; G01S 2013/9329; G01S 17/74; G02B 5/12; H01Q 1/02; H01Q 1/42; H01Q 15/18; H01Q 15/23
  See application file for complete search history.

(56) References Cited

U.S. PATENT DOCUMENTS

| | | |
|---|---|---|
| 2004/0033472 A1 | 2/2004 | Varshneya |
| 2006/0181894 A1* | 8/2006 | Chinniah ................ F21V 29/83 362/547 |
| 2009/0097234 A1 | 4/2009 | von Malm |
| 2009/0301124 A1* | 12/2009 | Kalfon .................. A47F 3/0469 62/264 |
| 2015/0048572 A1 | 2/2015 | Hochschild, III et al. |

FOREIGN PATENT DOCUMENTS

| | | |
|---|---|---|
| WO | WO 2011/109666 A2 | 9/2011 |
| WO | WO 2013/008213 A2 | 1/2013 |

OTHER PUBLICATIONS

International Preliminary Examining Authority, International Preliminary Report on Patentability, Chapter II, including Applicant's Jan. 18, 2021 response to the ISA's Written Opinion, received for International Application No. PCT/SE2018/051307, Feb. 15, 2021, 11 pages, Swedish Patent and Registration Office, Sweden.

European Patent Office, Extended European Search Report received for Application No. 18942661.2, Jun. 27, 2022, 9 pages, Germany.

* cited by examiner

REFLECTOR DEVICE AND SYSTEM FOR SELECTIVE REFLECTION OF ELECTROMAGNETIC RADIATION

CROSS REFERENCE TO RELATED APPLICATIONS

This application is a National Stage Application, filed under 35 U.S.C. § 371, of International Application No. PCT/SE2018/051307, filed Dec. 13, 2018; the contents of which are hereby incorporated by reference in their entirety.

BACKGROUND

Related Field

The present disclosure relates to a reflector device for achieving a selective reflectance of electromagnetic radiation.

DESCRIPTION OF RELATED ART

Electromagnetic radiation (EMR) reflectors are able to send incident EMR of at least some wavelengths back towards the direction they came from. Reflectors able to send EMR back towards the source of the EMR with minimum scattering are called retroreflectors. Retroreflectors can be found in nature, e.g., the eye of many vertebrates comprise a tissue layer, tapetum lucidum, which is a retroreflector and gives rise to eyeshine. Since retroreflectors can send incident EMR back towards the EMR source retroreflectors can be designed to easily be detected over long distances with detection and ranging devices, such as radar or lidar. As the cost of producing detection and ranging devices decreases and more detection and ranging devices are integrated into consumer goods, such as parking sensors in cars, the opportunities to use retroreflectors to increase visibility of objects for both human and AI operators increases. In target training systems, such as weapon simulation combat training target system, there is a constant demand for reflectors that are less expensive, lighter and less likely to unintentionally expose targets comprising a reflector.

In order for a reflector to reflect incident EMR along a vector that is parallel but opposite in direction to the vector of the incident radiation with minimum scattering the geometry of the reflecting surface of the reflector must be carefully selected and maintain its geometry. Reflectors with a reflector surface geometry of a cube's corner are suitable as retroreflectors. A commonly used type of high-fidelity retroreflector is based on a solid glass prism with layers of deposited metal functioning as reflective surfaces. The glass prisms-type reflectors are costly to produce, have a significant weight since the prisms are solid and have poor thermal conductivity. The low thermal energy transfer of glass prism-type reflectors may result in asymmetric deformation and water condensation on surfaces. Assuming that a lobe of EMR sent out by a detection and ranging device is significantly larger than the reflector the amount of reflected EMR is proportional to the cross sectional area of the reflector. Scaling up a glass prism reflector causes the weight to increase by the $3^{rd}$ power while the cross sectional area increases by the $2^{nd}$ power, which may result in impractically heavy prism as the reflector is scaled up. Another type of reflectors are the hollow retroreflectors, wherein a cubic corner is formed by three walls of a EMR reflective material. Assuming the walls of a hollow retroreflector are kept at the same thickness a scaled up version of the hollow reflector may weigh significantly less than a reflector of the solid glass prism-type.

One object of the invention is to improve the functionality of EMR reflectors.

One object of the invention is to provide selective reflectance of EMR reflectors.

One object of the invention is to provide a low cost EMR reflector.

One object of the invention is to provide a low weight EMR reflector.

One object of the invention is to provide an EMR reflector with thermal conduction higher than glass.

One object of the invention is to provide an EMR reflector with a controlled environment at the reflector surface.

One object of the invention is to suppress reflections in the visual spectrum of EMR.

One object of the invention is to provide band pass filter selective EMR reflectance.

One object of the invention is to provide band pass filter selective EMR reflectance for wavelengths 880-930 nm.

At least one of the objects has in accordance with the present disclosure been achieved by means of a reflector device that reflects electromagnetic radiation (EMR) selectively. For achieving a selective reflectance of EMR, a retroreflector comprising a reflector cavity with a sealing front cover and a controlled internal environment is provided. From here on the term reflector will be used instead of the term EMR retroreflector, as all reflectors mentioned in the present disclosure are EMR retroreflectors.

The reflector comprises a reflector element arranged to reflect EMR. The reflector comprises a reflector cavity having a front opening through which incident EMR enters before reaching the reflector element. The reflector element may be a hollow tetrahedron with one face open, such as a cubic corner reflector. The reflector element may be made out of sheet metal, such as aluminium sheet metal. The use of sheet metal allows the reflector to be light weight. The use of sheet metal with a constant thickness may allow a reflector design to be scaled in size without the weight changing by the $3^{rd}$ power, as may be the case for a solid glass prism-type reflector. The ability to scale a reflector is important as the maximum range for detecting a reflector is proportional to the effective area of the reflector. The present disclosure relates to reflectors with dimensions ranging from tenths of a millimetre to several meters, wherein the largest reflectors may be suitable in space applications where distances are very large and factors such as low weight and ease of construction are important.

The reflector element comprising sheet metal may result in a high thermal conduction through the reflector element, thus decreasing the problems related to uneven thermal expansion and condensation. The reflector comprises a front cover arranged to form a gastight seal at the front opening. Thereby, the reflector cavity forms an enclosed volume. The sealing front cover allows the volume between the front cover and the reflective surface to be separated from the ambient atmosphere. The reflector's selective reflection of electromagnetic radiation is achieved by the electromagnetic properties of the materials in the reflector cavity and in the front cover, as well as the material of the reflective surface.

In order for the reflector to reflect effectively, the front cover should have a high EMR transmittance in at least parts of the EM spectrum. The front cover may function as a short pass, long pass or band pass EMR filter. The reflector cavity may contain at least one gas and/or liquid and/or gel and/or solid material. In one example, the enclosed volume of the reflector cavity is filled with nitrogen gas. The content of the reflector cavity may comprise radio wave absorbing material. The content of the reflector cavity may function as a short pass, long pass or band pass EMR filter. The reflector comprising a front cover and an enclosed reflector cavity environment may be configured with a wide variety of materials for the front cover and inside the reflector cavity to change EMR attenuation and refractive index. In one example the reflector is arranged as a band pass filter around a specific desired wavelength for reflection, such as attenuating wavelengths outside 880-930 nm for a target training system utilizing the wavelength 905 nm.

The reflector may comprise a sensor. The sensor may be located inside the reflector cavity. The addition of a sensor may allow the reflector to detect when a detection and ranging device, such as radar or lidar, has sent EMR towards the reflector. For weapon simulation combat training target system utilizing pulse-coded EMR the sensor inside the reflector may allow the reflector to detect which weapon type and/or weapon that hit the reflector with a simulated shot. The reflector comprising a sensor may be arranged to provide information about the detected incident EMR to the object the reflector is attached to and/or integrated into. The object which the reflector is attached to and/or integrated into may be an UAV. The reflector comprising the sensor may be arranged to give some response if "shot" by pulse-coded EMR. The object which the reflector is attached to and/or integrated into may be arranged to communicate wirelessly to at least one device in the system, such as a detection and ranging device.

If the reflector cavity comprises gases and/or a material with high compressibility, and material cannot pass freely between the reflector cavity and the outside environment then a pressure difference between the inside and outside of the reflector cavity may occur. The pressure difference may occur when the temperature of the system changes. A pressure difference between the enclosed reflector cavity and the ambient atmosphere is undesirable as it causes stress and may deform a sensitive part of the reflector, such as the reflector element. In order to avoid pressure differences and maintain as much control as possible over the enclosed environment of the reflector cavity a number of additional features are proposed isolated or in different combinations.

The reflector may comprise at least one ambient pressure compensator arranged to deform in order to change the volume enclosed inside the reflector based on the ambient pressure. The pressure compensator may be a passive component such as a balloon or bellow arranged to change the volume of the reflector cavity due to the force generated by the pressure difference. The pressure compensator may be an active component adjusting volume based on a detected pressure difference. The front cover may function as a passive pressure compensator, bulging in or out. The requirement for utilizing the front cover as a pressure compensator without potential loss of reflector function is that the front cover thickness remains homogenous.

The reflector may comprise at least one gas inlet arranged to transport gas into and out of the reflector cavity. The use of a gas inlet may remove the need for a pressure compensator, however, the addition of an always-open gas inlet may allow for mass transfer between the reflector cavity and the environment.

The reflector may comprise at least one dehumidifier for dehumidification of gas within and/or entering the reflector cavity. The use of a dehumidifier and a gas inlet may be suitable for a reflector with a reflector cavity designed to contain dry air.

The reflector where the at least one gas inlet comprises a pressure equalization valve arranged to pressure equalize the reflector cavity and the atmosphere. The use of a pressure equalization valve may limit the mass transfer between the reflector cavity and the environment by only opening while the pressure difference is above a certain threshold. The pressure equalization valve may be an active or a passive component.

The reflector may comprise at least one filter membrane arranged in the at least one gas inlet to block non-gas transport, such as a Gore-Tex filter membrane. At least one filter membrane may be arranged to prevent particles above a certain size from moving through the at least one gas inlet. At least one filter membrane may be arranged to stop liquids from moving through the at least one gas inlet. A dehumidifier and a filter membrane may constitute the same part of the reflector.

The reflector may comprise multiple reflector cavities. The reflector comprising multiple reflector cavities may be sealed by one front cover. The reflector surfaces of the multiple reflector cavities may all be part of one continuous piece of material. The reflector surfaces of the multiple reflector cavities may be part of the same metal sheet. A reflector with multiple reflector cavities may have a shallow geometry and a large cross sectional area, unlike a reflector with one reflector cavity which has a similar width and depth due to the restrictions of the reflector element geometry.

The present disclosure further relates to a system for improved EMR detection and ranging, comprising at least one electromagnetic radiation detection and ranging device and at least one reflector, wherein at least one of the at least one reflector is an EMR selective reflector device of the present disclosure. The system may allow the at least one detection and ranging device to identify at least one reflector based on the EMR selective property of the reflector.

The system may be a target system such as a weapon simulation combat training target system. The system comprising at least one reflector with band pass filter functionality may be suitable as a weapon simulation combat training target system wherein EMR of a specific wavelength outside the visible spectra is used to simulate weapon shots on targets comprising the at least one reflector, and reflection of light in the visible spectra is undesired. The systems as a weapon simulation combat training target system comprising at least one reflector comprising a sensor may be arranged to detect a laser-pulsed "shot" allowing the target to determine what type of weapon and/or which individual weapon fired a simulated shot. The systems comprising at least one reflector comprising a lightweight metal reflector element may be suitable as a weapon simulation combat training target system comprising a reflector attached to and/or integrated into an aerial target, such as an UAV or a pod.

The system may be a position determining system for improved visibility and autonomous perception. The at least one detection and ranging device may be attached to and/or integrated into at least one vehicle. The at least one reflector may be attached to and/or integrated into at least one vehicle. The at least one reflector may be attached to and/or integrated into an item arranged to be worn by a person. The at least one reflector may be attached to and/or integrated into at least one stationary object. The systems as a position determining system may be arranged to provide the navigation system of an autonomous vehicle with positional and/or spectral information of detected reflectors. The position determining system may be used to more reliably land for example an autonomous UAV comprising a detection and ranging device onto a landing platform comprising at least one reflector, wherein the detection and ranging device after detecting the at least on landing platform reflector continuously provides information to the UAV navigation system.

The present disclosure further relates to a method for improved EMR detection and ranging, comprising at least one electromagnetic radiation detection and ranging device and at least one reflector, as presently disclosed.

The present disclosure further relates to a method for improved EMR detection and ranging, comprising standardized patterns of reflectors, as presently disclosed. The reflectors may be located to form a pattern in a plane or a curved surface, such as a triangle, a rectangle or any other recognizable pattern. The reflectors may be arrange to selectively reflect EMR based on the reflector's position in the pattern. The use of EMR selective reflectors in standardized patterns may be used to identify objects or parts of objects. The use of EMR selective reflectors in standardized patterns attached to and/or integrated into the corners and/or sides of a vehicle may allow a detection and ranging device to determine the orientation of said vehicle by analysing the EMR from the reflectors. Reflectors attached to and/or integrated into emergency vehicles, such as ambulances and fire trucks, may have a combination of patterns and EMR selectivity unique to emergency vehicles. The method comprising both a pattern of reflectors and different reflector EMR selectivity may significantly decrease the risk of a detection and ranging device generating a false positive, that is, interpreting a non-reflector as a reflector.

DETAILED DESCRIPTION OF VARIOUS EMBODIMENTS

Throughout the figures, same reference numerals refer to same parts, concepts, and/or elements. Consequently, what will be said regarding a reference numeral in one figure applies equally well to the same reference numeral in other figures unless not explicitly stated otherwise. The electromagnetic radiation (EMR) retroreflector of the present disclosure will be referred to as the reflector.

Figure 1:
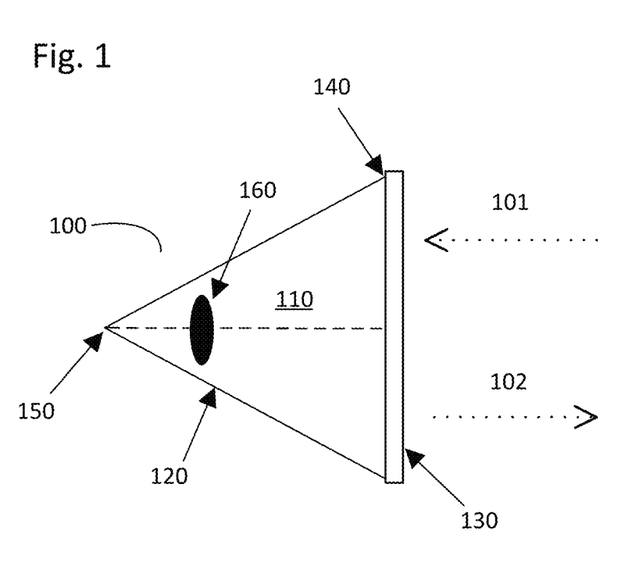
FIG. 1. illustrates schematically an example of a reflector.

FIG. 1 shows schematically a reflector 100 according to the present disclosure. The reflector is intended to reflect an incident electromagnetic wave 101 so that the reflected electromagnetic wave vector 102 is parallel to the incident wave vector 101 but of opposite direction.

The reflector 100 comprises a reflector cavity 110 having a front opening for EMR entering into the reflector cavity 110. The EMR is subsequently reflected by a reflector element 120 arranged within the reflector cavity 110. The reflector element 120 comprises a hollow structure arranged to reflect incident EMR 101 entering through the front opening in such a way that the reflected EMR 102 exits through the front opening along a vector parallel to the incident radiation 101 vector but with opposite direction. The hollow structure of the reflector element 120 may be a hollow tetrahedron with one face open. The angles of the reflector element 120 in the schematic 2D side view visualisations of the reflector in FIG. 1 (and also in FIG. 2), were chosen for aesthetic reasons and does not represent the actual geometry of the reflector element 120. The reflector element 120 may be made out of metal. The reflector element 120 may be formed from sheet metal, such as aluminium sheet metal.

The reflector comprises a front cover 130 arranged at the front opening of the reflector cavity 110 to form a gastight seal 140. In FIG. 1 the front opening of the reflector cavity 110 and the open face of the reflector element 120 are located in the same plane. This is not a requirement. Additional structure may be added between the reflector element 120 and the gastight seal 140. The hollow structure of the reflector element 120 may be a hollow tetrahedron with one face open, oriented such that the line going through the centroid of the open face and the opposite vertex corner 150 is orthogonal to the plane of the front cover 130. The hollow tetrahedron with one face open may be a cubic corner reflector element comprising reflector surfaces in three mutually perpendicular planes. The gastight seal 140 between front cover 130 and front opening makes the reflector cavity 110 an enclosed volume separated from the ambient atmosphere. The enclosed reflector cavity 110 allows the reflector cavity 110 to be filled with a specific gas, liquid, gel and/or solid material in order to alter the reflector cavity properties, such as EMR attenuation, refractive index and/or compressibility.

The reflector cavity 110 may contain inert gas, such as nitrogen gas. The reflector cavity 110 may contain dry air. The reflector cavity 110 may comprise a gel, such as a cross linked silicon material (commercially available examples are QGel 319 and Sylgard 184). The reflector cavity 110 may comprise a gel and at least one other material distributed throughout the gel, such as a dye. The reflector cavity 110 may comprise a thermosetting polymer, such as polyurethane (a commercially available examples is NP1484). The material in the reflector cavity 110 has a high transmittance in at least parts of the EM spectrum. The material in the reflector cavity 110 may function as a short pass filter, attenuating radio waves. The material in the reflector cavity 110 may function as a band pass filter.

The front cover 130 has high transmittance in at least parts of the EM spectrum. The front cover 130 may comprise EMR attenuating material. The front cover 130 may function as a long pass filter. The front cover 130 may function as a band pass filter. The front cover 130 may comprise an anti-reflective material and/or surface treated film. In one embodiment of the present disclosure the front cover 130 is designed with the intent to minimize the reflector's visibility in the visual spectra while reflecting EMR in at least one spectrum outside the visual spectrum with high transmittance. The front cover 130 may comprise multiple layers. The front cover 130 can be deformed with minimal loss of reflector function under the condition that the front cover 130 thickness remains homogenous. The front cover 130 may comprise at least one layer of plastic material, such as a polycarbonate, polyester or polyamide film. (Commercially available examples are Mylar and Grilamid TR90.)

The reflector reflecting EMR selectively may function as an EM filter with short, long and/or band pass filter based on the EMR properties of the front cover 130 and/or the reflector cavity 110 material and/or the reflector element 120 material. The reflector functioning as a band pass filter may have a spectrum band with high transmittance centred around a specific wavelength utilized by a detection and ranging device, such as the 880-930 nm band for the 905 nm wavelength utilized in shooting simulation devices of weapon simulation combat training target systems.

The reflector may comprise a sensor 160. The sensor 160 may be located inside the reflector cavity 110. In a preferred embodiment of the present disclosure the reflector element 120 comprises a hollow tetrahedron with one face open and the sensor 160 is facing the front cover 130 and is positioned between the centroid of the open face and the opposite vertex corner 150. The sensor 160 positioned between the centroid of the open face and the opposite vertex corner 150 may be arranged as close to the vertex corner 150 as practically possible. The sensor 160 may be arranged to detect pulse-coded EMR, such as a pulse-coded shot from a weapon simulation device in a weapon simulation combat training target system. The ability for the reflector to detect pulse-coded EMR with a sensor 160 allows reflectors used in, e.g. a weapon simulation combat training target system to determine both when the reflector was "shot" and by which simulated weapon the reflector was "shot". The sensor 160 may be arranged to provide information regarding the detected EMR. The sensor 160 may be arranged to provide information regarding the detected EMR to a computer comprised in the object the reflector is arranged on and/or integrated into.

The reflector may comprise a multitude of reflector cavities 110. The multitude of reflector cavities may be produced from one sheet of metal formed into a multitude of connected reflector elements 120. The multitude of reflector cavities may be sealed with only one front cover 130.

Figure 7:
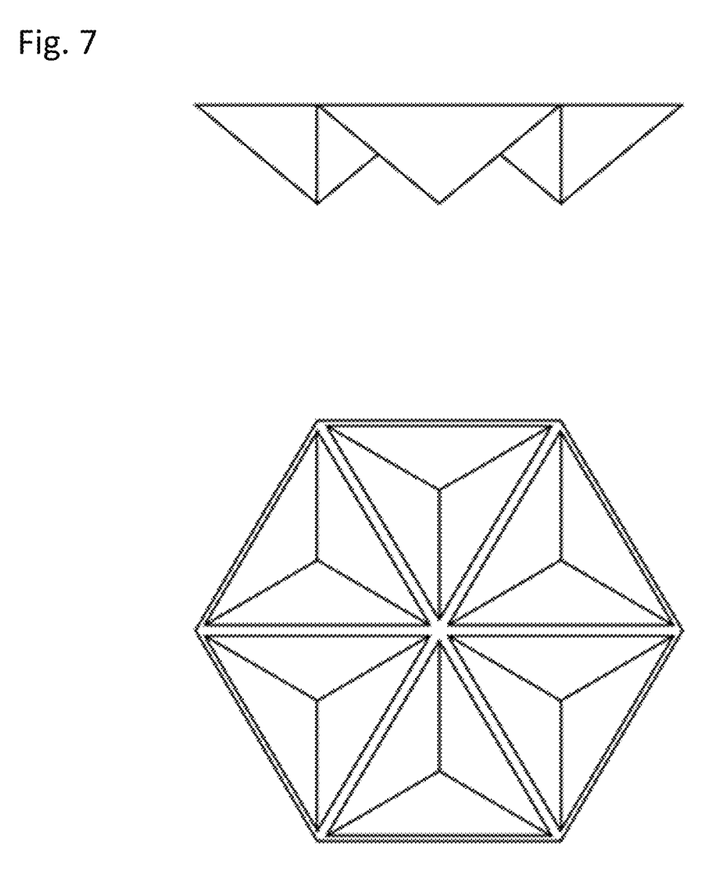
FIG. 7 illustrates schematically an example of a reflector comprising multiple reflector cavities.

FIG. 7 shows an illustration of a reflector comprising six reflector cavities 110. A reflector with one reflector cavity and with the same surface area would be significantly deeper than the reflector shown in FIG. 7.

Figure 2:
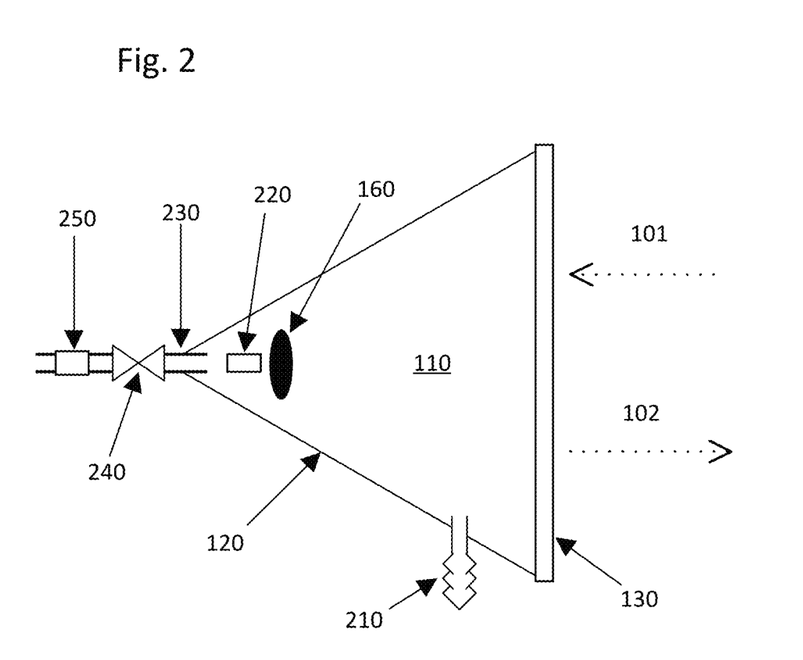
FIG. 2. illustrates schematically an example of a reflector with a gas inlet, a dehumidifier, a pressure equalization valve and a particle filter.

FIG. 2 shows schematically the reflector of the present disclosure shown schematically in FIG. 1 comprising optional additional components. It should be noted that an reflector may be formed comprising one, some or all of the additional depicted components.

The reflector may comprise an ambient pressure compensator 210 arranged to change the volume of the enclosed reflector cavity by deforming the ambient pressure compensator 210 based on the pressure difference between the reflector cavity 110 and the ambient environment. The ambient pressure compensator 210 may be passive, namely deformed by the forces caused by the pressure difference, such as a partially inflated balloon or a bellow. The ambient pressure compensator 210 may comprise an active component expending energy to deform based on a detected pressure difference. The front cover 130 may comprise an ambient pressure compensator 210. The ambient pressure compensator 210 may at least partly be formed within the front cover 130. The outer surface of the front cover is then arranged to be deformed to either become convex or concave. Deformation of the front cover 130 does not adversely affect reflector function as long as the front cover 130 thickness is homogenous. A pressure difference between the enclosed reflector cavity 110 and the ambient atmosphere is undesirable as it causes stress and may deform a sensitive part of the reflector, such as the reflector element 120.

The reflector may comprise a dehumidifier 220 arranged to remove water from the reflector cavity 110. The dehumidifier may comprise a hygroscopic desiccant material, such as silica gel. Water droplet formation on the reflective surface of the reflector element 120 or on the front cover 130 adversely affects reflector function.

The reflector may comprise a gas inlet 230 arranged to allow transport between the reflector cavity 110 and the outside. The gas inlet 230 may allow a pressure difference between the reflector cavity 110 and the ambient atmosphere to be decreased by a passive transport of gas through the gas inlet 230. The use of a gas inlet 230 may result in the reflector cavity 110 not being an enclosed volume separated from the ambient environment. The use of a gas inlet 230 may remove the need for an ambient pressure compensator 210. In a preferred embodiment of the present disclosure the inlet enters the reflector cavity 110 at the vertex corner 150 of the reflector element 120. At least one dehumidifier 220 may be arranged inside and/or at the end of a gas inlet 230.

The reflector may comprise a pressure equalization valve 240 arranged to open the connection between reflector cavity 110 and the outside depending on the pressure difference. The pressure equalization valve 240 may be an active or passive component. The addition of an always-open gas inlet 230 solves the issues with pressure differences but the reflector cavity 110 is no longer an enclosed volume and may no longer be an easily controlled volume. The addition of a pressure equalization valve 240 may be arranged to limit the transport through the gas inlet 230 to only take place when pressure equalization is required, thus regaining some control over the reflector cavity 110 environment.

The reflector may comprise a filter membrane 250 arranged inside, or at an end of, the gas inlet 230 to limit non-gas transport. The function of the filter membrane 250 may be to filter out particles above a certain size from the gas transported through the filter membrane 250. The filter membrane 250 may be a Gore-Tex filter. The reflector may comprise a part comprising both a dehumidifier 220 and a filter membrane 250, such as a desiccant filter breather.

Figure 3:
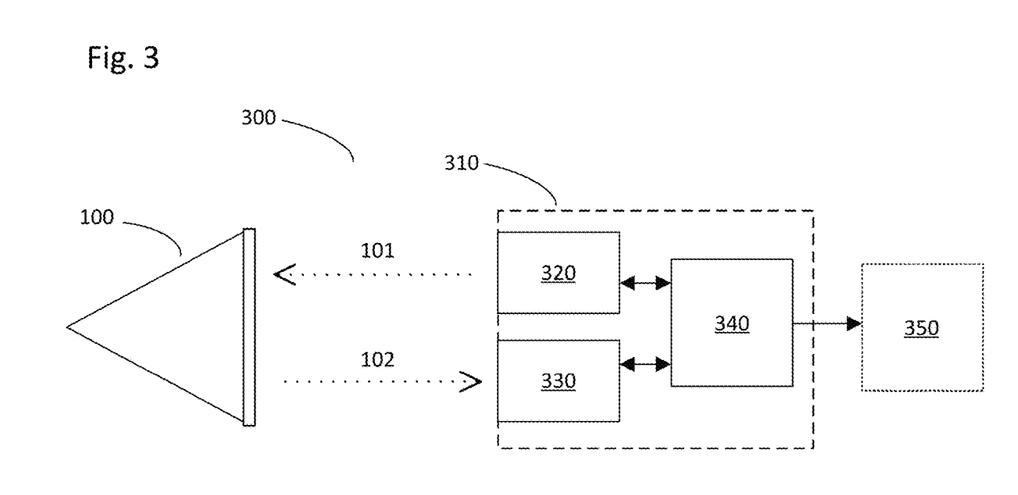
FIG. 3. illustrates schematically a system according to a first example comprising a detection and ranging device and a reflector.

FIG. 3 shows schematically a system for detection and ranging comprising a reflector. The system 300 comprises at least one EMR detection and ranging device 310 and at least one reflector 100, according to the present disclosure. Thus, the reflector 100 may have some or all of the features as discussed in relation to FIGS. 1 and 2. The EMR detection and ranging device 310 comprises at least one EMR emitter 320, at least one EMR detector 330 and a processor 340. The EMR detection and ranging device 310 may be a radar or a lidar device.

The system 300 for detection and ranging may be a target system, such as a combat target simulation system.

The system 300 for detection and ranging may be a position determining system. The positioning determining system may be arranged to determine a relative position of at least one reflector. The position determining system may also have object recognition capabilities. For example, characteristics of EMR reflected from the reflector may be EMR selective to enable unique identification of for example vehicles. The identification of reflector arrangements may be wavelength selective and/or pattern selective or a combination thereof.

The EMR emitter 320 may be a laser. The EMR detector 330 may be a camera. The EMR emitter 320 and EMR detector 330 may both at least partially comprise the same at least one component of the detection and ranging device 310, such as a radar antenna.

The EMR emitter 320 is arranged to send out EMR 101. The EMR 101 sent out by the EMR emitter 320 may be pulse-coded. The EMR detector 330 is arranged to detect reflected EMR 102. The reflected EMR 102 comprises EMR sent out by the EMR emitter 320, which has interacted with the environment and returned to the EMR detector 330 of the EMR detection and ranging device 310. The EMR's interaction with the environment is typically a reflection which allows, among other things, a distance to be measured from the radar device 310 to the object causing the reflection. The EMR detector 330 may be arranged to detect EMR 102 in at least one narrow band of the EM spectrum. The EMR emitter 320 may be arranged to only send out EMR 101 in at least one narrow band of the EM spectrum. The reflector 100 may be arranged to reflect a significantly higher fraction of photons from at least one EM band compared to the remaining EM spectrum. The reflector 100 may be arranged to only reflect a significant fraction of photons for at least some wavelengths outside of the visual spectrum.

The processor 340 is arranged to control at least one EMR emitter 320 and at least one EMR detector 330. The processor 340 is arranged to acquire information regarding emitted EMR 101 from the at least one emitter 320 and detected EMR 102 from at least one detector 330. The processor 340 is arranged to process the EMR information for detection and ranging. The processor 340 may be arranged to calculate the distance to objects reflecting EMR based on the time difference between EMR emission and detection. The processor 340 may be arranged to identify EMR selective reflectors based on the detected EMR. The processor 340 may be arranged to identify EMR selective reflectors based on the difference in relative spectral intensity between EMR emission and detection. The processor 340 may be arranged to detect spatial patterns of reflectors. The processor 340 may be arranged to detect spatial patterns of reflectors and to identify EMR selective reflectors in order to make reflector detection more reliable.

The processor 340 may be arranged to provide the detection and ranging information to a display unit 350. The processor 340 may be arranged to provide the detection and ranging information to a navigation system of a vehicle. The processor 340 may be arranged to provide the detection and ranging information to an autonomous vehicle system, such as the software system of a self-driving car. The processor 340 may comprise a memory storage containing the software required to process the EMR information. The memory storage containing the software may be non-volatile.

Figure 4:
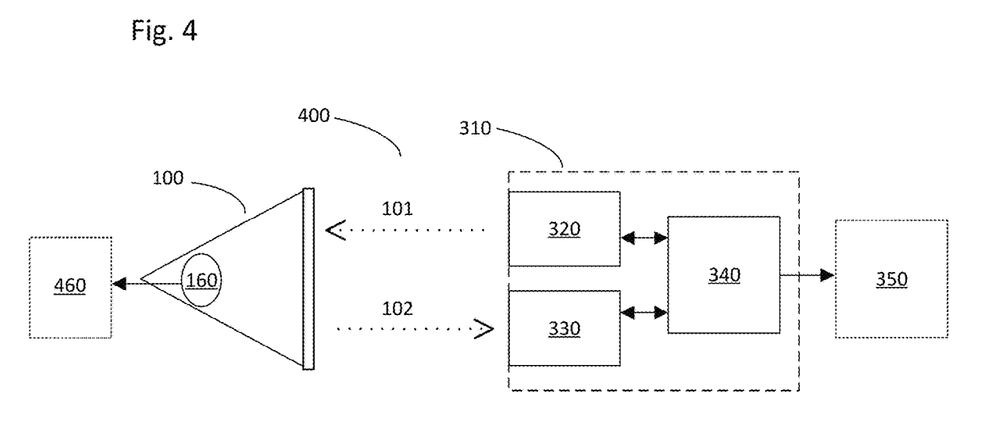
FIG. 4 illustrates schematically a system according to a second example, said system being arranged for detection and ranging and comprising a reflector comprising an EMR sensor.

FIG. 4 shows schematically a system 400 for detection and ranging comprising a reflector 100 comprising an EMR sensor 160. The sensor 160 may be arranged inside the reflector cavity 110. The system may comprise a multitude of sensors. The sensor 160 may be arranged to detect pulse-coded EMR. The sensor 160 may be arranged to provide information relating to the detected EMR to a computer 460 in the object the reflector 100 is attached to and/or integrated into. The computer 460 may be arranged to communicate with a detection and ranging device 310. The computer 460 may be arranged to wirelessly communicate information of detected EMR provided by a sensor 160 to a device comprised in the system 400. The computer 460 may be arranged to wirelessly communicate information of detected EMR to a detection and ranging device 310.

In different embodiments of the present disclosure the system 400 is a weapon simulation combat training target system comprising a reflector 100 comprising a reflector element 120, a reflector cavity 110 and a front cover 130. The weapon simulation combat training target system comprises at least one EMR detection and ranging device 310 arranged on a weapon to simulate shooting. The weapon simulation combat training target system may comprise the reflector attached to and/or integrated into at least one vehicle and/or moving target, such as a target pod, an armoured vehicle or an UAV. The weapon simulation combat training target system may comprise at least one reflector attached to and/or integrated into an item arranged to be worn by a person, such as a helmet or a vest.

In different embodiments of the present disclosure the system 400 is a position determining system for improved visibility and autonomous perception by detection and ranging comprising a reflector 100 comprising a reflector element 120, a reflector cavity 110 and a front cover 130. The position determining system comprises at least one EMR detection and ranging device 310, such as a radar or a lidar device. In systems comprising at least two reflectors 100 the at least two reflectors 100 may be arranged to reflect EMR wavelengths differently allowing the EMR detection and ranging device 310 to distinguish between reflectors. The device for EMR detection and ranging 310 may be attached to and/or integrated into at least one vehicle, such as a car or aircraft. The position determining system may comprise at least one reflector 100 attached to and/or integrated into at least one vehicle and/or at least one item arranged to be worn by a person, such as a bicycle or a helmet. The position determining system may comprise at least one reflector 100 attached to and/or integrated into at least one stationary object, such as a road marker or a radio tower. The position determining system may comprise at least one EMR detection and ranging device 310 arranged on a sea vessel and at least one reflector 100 arranged on at least one seamark and/or other object typically listed on nautical charts. The position determining system for improved visibility and autonomous perception may allow for high-resolution positional and directional information of vehicles, persons and stationary objects equipped with at least one reflector 100.

Figure 5:
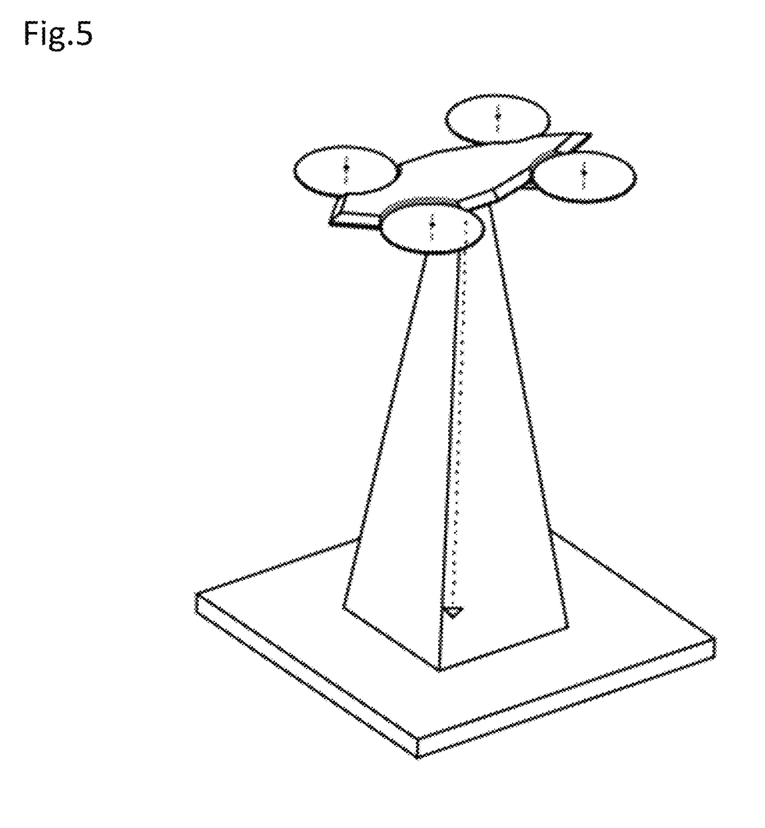
FIG. 5 illustrates schematically an example of a system comprising an UAV and a landing platform comprising reflectors.

In different embodiments of the present disclosure the position determining system for improved visibility and autonomous perception by detection and ranging is a system for precision inflight of a drone towards a landing platform comprising at least one reflector 100.

FIG. 5 Illustrates schematically the system for precision inflight of a drone towards a landing platform comprises a drone with an EMR detection and ranging device 310 and a landing platform comprising at least one reflector 100. The EMR detection and ranging device 310 may be arranged to provide information to the navigation system of the drone allowing the drone to land autonomously once in visual range of at least one reflector 100 arranged on the landing platform.

In different embodiments of the present disclosure the position determining system for improved visibility and autonomous perception by detection and ranging is a system for autonomous agricultural vehicle operation. At least one EMR detection and ranging device 310 is arranged on at least one agricultural vehicle. The at least one EMR detection and ranging device 310 is arranged to provide information relating to the detected EMR to the navigation system of at least one agricultural vehicle.

The system comprises at least one reflector 100 arranged on a stationary object. The system may comprise at least one reflector 100 arranged on at least one agricultural vehicle. The system may comprise at least one reflector 100 arranged on at least one animal, such as a domestic animal. At least some of the at least one reflector 100 may form a perimeter of reflectors 100 enclosing an area. The perimeter may define the intended area of operation for the autonomous agricultural vehicle. In systems comprising at least two reflectors 100 at least two reflectors 100 may be arranged to reflect EMR wavelengths differently allowing the at least one EMR detection and ranging device 310 to distinguish between reflectors.

The system for autonomous agricultural vehicle operation may be arranged in an inverse fashion comprising at least one reflector 100 arranged on the at least one agricultural vehicle and at least one EMR detection and ranging device 310 arranged on at least one stationary object. In the case of reflectors 100 arranged on agricultural vehicles some form of wireless communication may be required to inform the vehicles navigation system of positional information calculated by the at least one EMR detection and ranging device 310 arranged on and/or integrated into at least one stationary object. Wireless communication for systems utilizing reflectors 100 with sensors 160 may occur via pulse coded signals from the EMR detection and ranging device 310. The system for autonomous agricultural vehicle operation may comprise any combination of at least one reflector 100 and at least one EMR detection and ranging device 310 arranged on any combination of stationary objects and/or animals and/or agricultural vehicles. The present disclosure also relates to systems similar the system for autonomous agricultural vehicle operation, such as systems for autonomous lawn mower operation comprising at least one EMR selective reflector 100.

The present disclosure further relates to a method for improved EMR detection and ranging, comprising at least one electromagnetic radiation detection and ranging device 310 and at least one reflector 100, according to the present disclosure.

The present disclosure further relates to a method for improved EMR detection and ranging, comprising at least one EMR detection and ranging device 310 and standardized patterns of reflectors 100 according to the present disclosure. The EMR selective properties of each reflector 100 may be based on the reflector's position in the pattern and/or received EMR frequency characteristics. Thereby, object recognition capabilities are provided. Objects may be recognized based on characteristics of EMR reflected from the reflector. The reflections may be EMR selective to enable unique identification of different types of objects. The identification of reflector arrangements may be wavelength selective and/or pattern selective or a combination thereof. The object recognition may utilize knowledge of characteristics of standardized reflector arrangements. For example, unique patterns and/or wavelength selectivity of reflectors may be used for identifying for example emergency vehicles.

Figure 6:
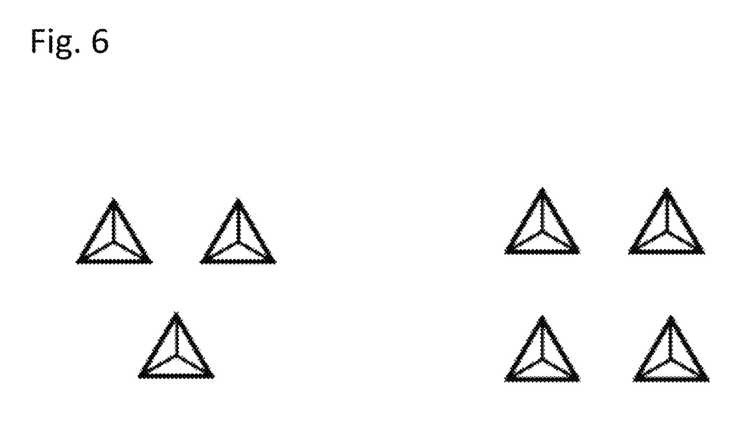
FIG. 6 illustrates schematically two different examples of reflector patterns.

FIG. 6 shows examples of two possible patterns for arranging reflectors 100 in a standardized manner. The EMR selective reflectors 100 in standardized patterns may be used to identify objects or parts of objects. The EMR selective reflectors 100 in standardized patterns may be attached to and/or integrated into the corners and/or sides of a vehicle, allowing a detection and ranging device 310 to determine the orientation of a vehicle based on the EMR reflected by reflectors 100. The standardized reflector patterns and EMR selectivity of reflectors 100 may be unique for certain types of vehicles, such as emergency vehicles.

The foregoing description of the preferred embodiments of the present disclosure is provided for illustrative and descriptive purposes. It is neither intended to be exhaustive, nor to limit the present disclosure to the variants described. Many modifications and variations will obviously suggest themselves to one skilled in the art. The embodiments have been chosen and described in order to best explain the principles of the present disclosure and their practical applications and thereby make it possible for one skilled in the art to understand the present disclosure for different embodiments and with the various modifications appropriate to the intended use.

The invention claimed is:

1. A reflector (100) comprising a reflector element (120) having a hollow structure and a front opening, the hollow structure and the front opening of the reflector element together defining a reflector cavity (110),
wherein:
the reflector is configured to received electromagnetic radiation (EMR) into the reflector cavity (110) via the front opening, for subsequent reflection of the EMR by the reflector element (120),
the reflector further comprises a front cover (130) which is EMR transmissive in at least parts of the EM spectrum, the front cover (130) being arranged to cover the front opening of the reflector cavity (110) at the reflector element (120), and
the front cover (130) and the reflector element (120) form a gastight seal (140) to prevent transport of material into and out of the reflector cavity (110) through the front opening.

2. A reflector according to claim 1, wherein the front cover (130) function as a long pass filter.

3. A reflector according to claim 2, wherein the front cover (130) function as a long pass filter arranged to attenuate wavelengths below 880 nm.

4. A reflector according to claim 1, wherein the reflector element (120) is a metal reflector element.

5. A reflector according to claim 1, wherein the reflector element (120) comprises a hollow tetrahedron with one face open, oriented such that the line going through the centroid of the open face and the opposite vertex corner (150) is orthogonal to the plane of the front cover (130).

6. A reflector according to claim 5, wherein the hollow tetrahedron with one face open is a cubic corner.

7. A reflector according to claim 1, comprising at least one EMR sensor (160).

8. A reflector according to claim 7, wherein at least one of the at least one EMR sensor (160) is facing the front cover (130) and is positioned between the centroid of the open face and the opposite vertex corner (150).

9. A reflector according to claim 7, wherein the at least one EMR sensor (160) is arranged to detect pulse-coded EMR.

10. A reflector according to claim 1, wherein the reflector cavity (110) contains inert gas.

11. A reflector according to claim 1, comprising at least one ambient pressure compensator (210) arranged to deform in order to change the volume enclosed inside the reflector based on the pressure difference between inside the reflector cavity (110) and outside the reflector.

12. A reflector according to claim 11, wherein the front cover (130) comprises an ambient pressure compensator (210).

13. A reflector according to claim 1, wherein the reflector cavity (110) contains dry air.

14. A reflector according to claim 1, comprising at least one gas inlet (230) arranged to transport gas in and out of the reflector cavity (110).

15. A reflector according to claim 14, where the at least one gas inlet (230) comprises a pressure equalization valve (240) arranged to pressure equalize the reflector cavity (110) and the surrounding atmosphere.

16. A reflector according to claim 1, comprising at least one dehumidifier (220) for dehumidification of gas within and/or entering the reflector cavity (110).

17. A reflector according to claim 14, comprising at least one filter membrane (250) arranged in at least one of the at least one gas inlet (230) to block non-gas transport.

18. A reflector according to claim 17, wherein at least one of the at least one filter membrane (250) is a Gore-Tex filter membrane.

19. A reflector according to claim 17, wherein at least one of the at least one dehumidifier (220) and the at least one filter membrane (250) constitute the same part of the reflector.

20. A reflector according to claim 1, wherein the reflector cavity (110) comprises radio wave absorbing material.

21. A reflector according to claim 20, wherein the radio wave absorbing material comprises a radio wave absorbing gel.

22. A reflector according to claim 20, wherein the radio wave absorbing material comprises a radio wave absorbing thermosetting polymer.

23. A reflector according to claim 20, wherein the radio wave absorbing material comprises at least one other EMR absorbing material.

24. A reflector according to claim 20, wherein the radio wave absorbing material function as a short pass filter.

25. A reflector according to claim 24 wherein the radio wave absorbing material function as a short pass filter arranged to attenuate wavelengths above 930 nm.

26. A reflector according to claim 24, wherein the front cover (130) and radio wave absorbing material together constitute a band pass filter.

27. A reflector according to claim 25, wherein the front cover (130) and/or the at least one radio wave absorbing material in the reflector cavity (110) constitute a band pass filter with a centre wavelength of 905 nm.

28. A reflector according to claim 1, wherein the front cover (130) function as a band pass filter.

29. A reflector according to claim 28, wherein the front cover (130) function as a band pass filter with a centre wavelength of 905 nm.

30. A reflector according to claim 1, comprising a multitude of reflector cavities (110).

31. A system (300, 400) for improved EMR detection and ranging, comprising at least one
electromagnetic radiation detection and ranging device (310) and at least one reflector according to claim 1.

32. A system according to claim 31, wherein the system is a target system.

33. A system according to claim 32, wherein the system is a weapon simulation combat training target system.

34. A system according to claim 31, wherein the system is a position determining system for improved visibility and/or autonomous perception.

35. A positioning determining system according to claim 34, wherein at least one EMR detection and ranging device (310) is attached to and/or integrated into at least one vehicle and at least one reflector is attached to and/or integrated into at least one vehicle.

36. A positioning determining system according to claim 34, wherein at least one reflector is attached to and/or integrated into an item arranged to be worn by a person.

37. A positioning determining system according to claim 34, wherein at least one reflector is attached to and/or integrated into at least one stationary object.

38. Use of a reflector according to claim 1 in a target system.

39. Use of a reflector according to claim 1 in a position determining system.

40. A method for improved EMR detection and ranging based on received electromagnetic radiation reflected from a reflector according to claim 1, said method comprising
a step of emitting EMR,
a step of receiving incident EMR,
a step analysing incident EMR based on emitted EMR,
a step of detecting reflectors,
a step of detecting selective reflectance of reflectors,
a step of providing information of detected reflectors.

41. The method according to claim 40, further comprising a step of detecting patterns of reflectors.

42. A method according to claim 41, wherein the EMR selective properties of each reflector is based on the reflector's position in the pattern.

* * * * *